March 2, 1937. H. C. FOSTER ET AL 2,072,746
CONTROL APPARATUS FOR TARGET TRAPS
Filed Feb. 12, 1935 2 Sheets-Sheet 2
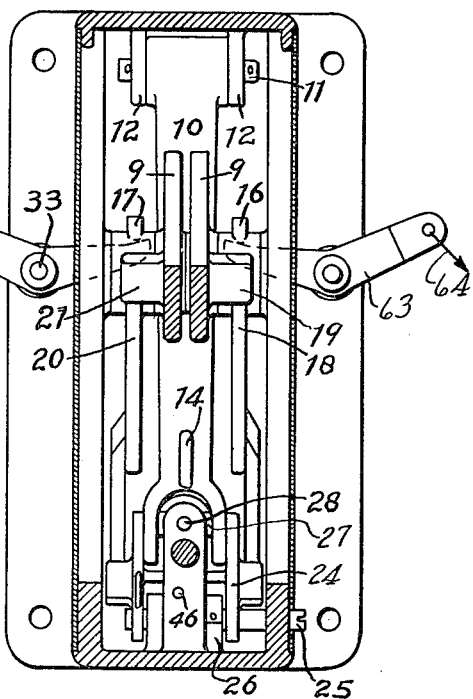
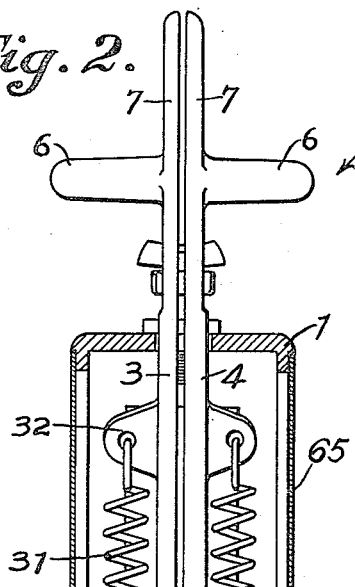
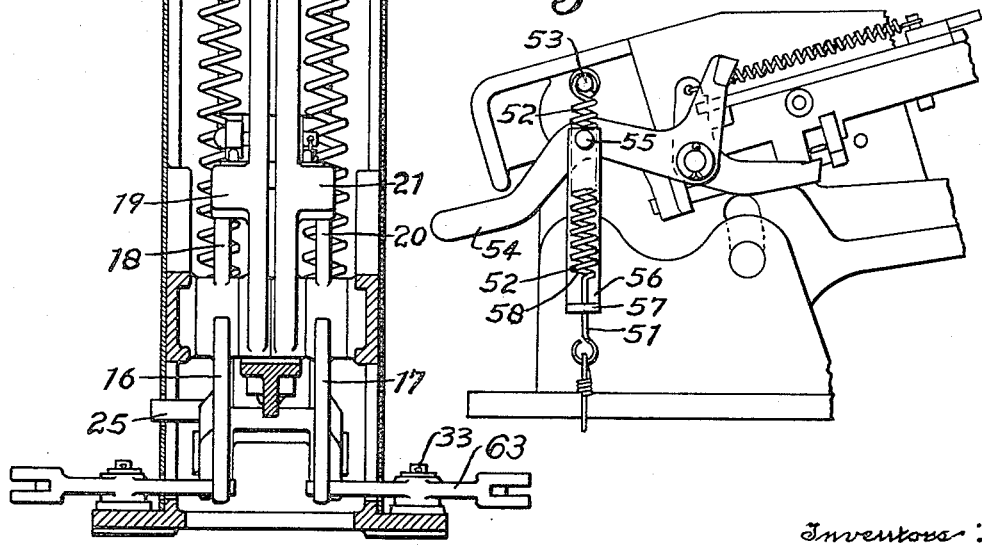
Inventors:
HARRY C. FOSTER AND LOUIS LEROY
By John H. Bruninga
Their Attorney.

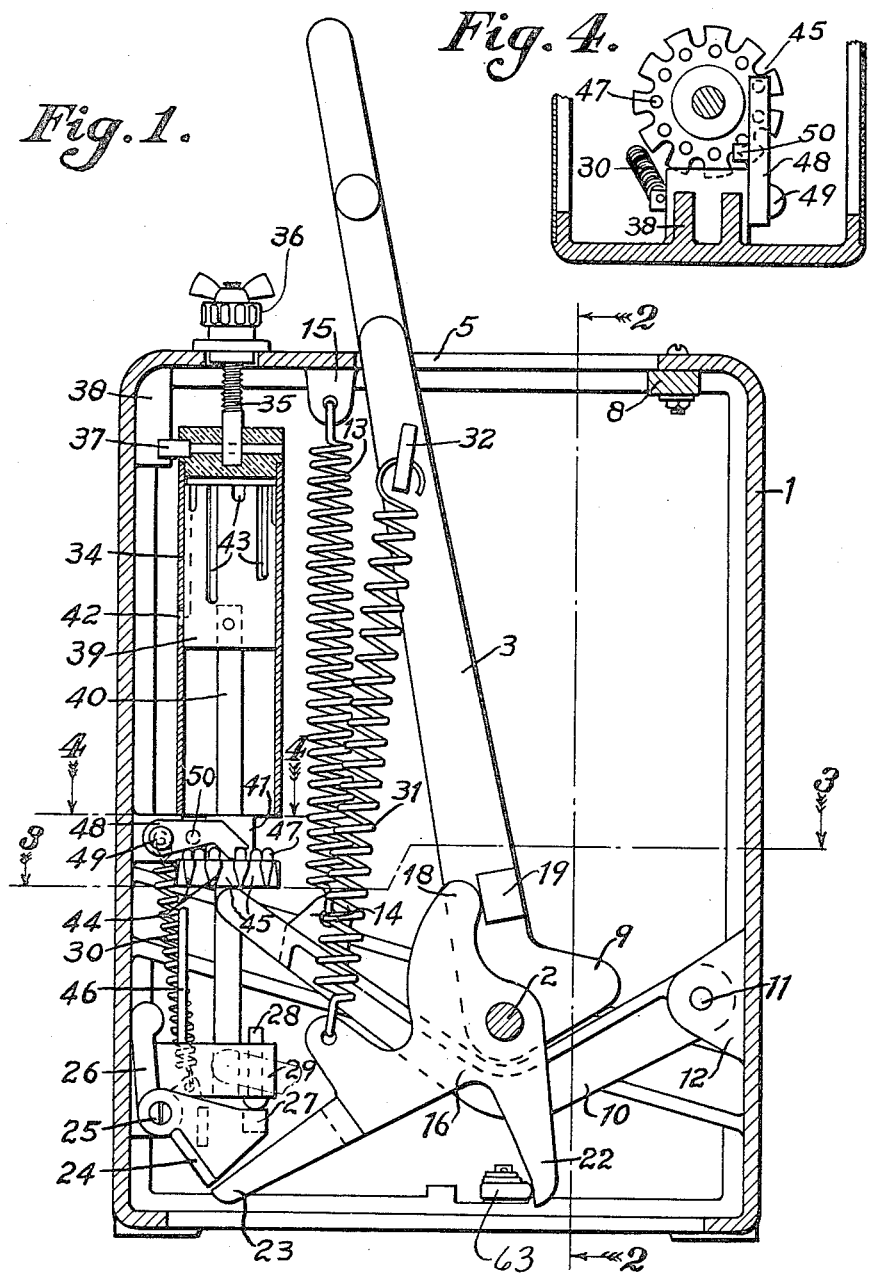

Patented Mar. 2, 1937

2,072,746

UNITED STATES PATENT OFFICE 2,072,746

CONTROL APPARATUS FOR TARGET TRAPS

Harry Clark Foster and Louis Leroy, Alton, Ill., assignors to Western Cartridge Company, East Alton, Ill., a corporation of Delaware Application February 12, 1935, Serial No. 6,149

16 Claims. (Cl. 124—3)

This invention pertains to control apparatus for target traps such as are used for throwing clay pigeons in trap shooting.

In certain kinds of trap shooting competitions contestants have been able to estimate with considerable accuracy the instant at which a target is to be launched. In some cases there has even been a suspicion of collusion with the operator of the trap so that the shooter may have the advantage of knowing exactly the instant at which the target is to be launched. It has been desirable, therefore, to provide control means adapted to time the operation of the trap so that neither the operator nor the shooter can have any foreknowledge of the instant at which the target is to appear.

One of the objects of this invention, therefore, is to provide such control means whereby the launching of the target may be delayed for a certain interval after operating the releasing handle.

Another object is to provide such control means adapted to vary this timing for successive operations of the trap.

Another object is to provide such means whereby the delay interval will vary between successive operations in an irregular manner.

Another object is to provide novel and reliable mechanism adapted to time the operation of the trap at irregular intervals for successive operations.

Another object is to provide such mechanism in which the timing is wholly beyond the control of the operator.

Further objects will appear from the following description taken in connection with the accompanying drawings, in which:

Figure 1 is a vertical longitudinal section of a control apparatus embodying this invention;

Figure 2 is a transverse section on line 2—2 of Figure 1;

Figure 3 is a horizontal section on line 3—3 of Figure 1;

Figure 4 is a partial horizontal section taken on line 4—4 of Figure 1; and

Figure 5 is a fragmentary view of the trap showing the releasing mechanism thereof.

In accordance with this invention timing mechanism is interposed between the operating handle at the pull station and the connections going to the trap to release the same, such timing mechanism being adapted to delay the actuation of the pull connections to the trap an uncertain interval after the operating handle is pulled.

Referring now to the drawings 1 designates a casing of any suitable description in which is journaled a shaft 2 upon which shaft is pivoted a pair of operating handles 3 and 4 working in a slot 5 in the top of the casing 1. The handles 3 and 4 are both pivoted on the shaft 2 and are of the same shape except that they bear a right and a left relation to each other. Each is provided with a horizontally extending grip 6 and an upstanding grip 7, the latter being an extension of the operating handle itself. The arrangement is such that either handle 3 or 4 may be operated individually by grasping the grip 6 and pulling the same to the right, Figure 1. The handles may be operated simultaneously so as to operate two traps at once by grasping both grips 7, each of which is in the form of a half grip, and pulling both handles simultaneously. A cushion stop 8 of rubber or the like is provided against which the handles may engage at the end of a pull. This not only reduces the jar on the mechanism but quiets the noise so as to avoid giving a warning thereby to the shooter. Each of the handles 3 and 4 is provided with a rearwardly extending cam extension 9 adapted to engage a lifting lever 10 pivoted at 11 on a suitable bracket 12 on the casing 1. The relation is such that when either handle 3 or 4 is pulled back its cam 9 will depress the lever 10. The latter lever is held up by a spring 13 engaging a lug 14 on the forward end of the lever 10 and secured to the casing at its other end at 15.

Also pivoted on the shaft 2 are two actuators 16 and 17, the former having an upstanding lug 18 engageable with a lug 19 on the handle 3 and the latter having a lug 20 engaging a lug 21 on the handle 4. The engagement of the lug 19 with the lug 18 maintains the actuator 16 in its inactive position as shown in Figure 1.

The actuators 16 and 17 are alike and further description will be confined to one of them. The actuator 16 has a downwardly extending arm 22 adapted to engage one arm of a bell crank 63 whose other arm is jointed to a pull connection 64 extending to one of the traps to be released.

The actuator 16 also has a forwardly extending arm 23 adapted for engagement with a sear 24 pivoted at 25 in the casing. This sear has a horizontally extending abutment 27 engaging the lower end of a firing pin 28 slidable in a bracket 29 on the front wall of the casing. The sear 24 is symmetrically formed with respect to the abutment 29 so that its lower edge extends in the path of both of the actuators 16 and 17. It is retained in elevated position by spring 30.

When one or both of the operating handles 3 and 4 are pulled back against the stop 8 the corresponding actuators 16 and 17 are lifted against the sear 24 by spring 31 connected between the actuator and a lug 32 on the operating handle, which spring is stretched when the handle is pulled back. This tends to activate the actuators 16 and 17 so that when the firing pin 28 is struck from the top so as to depress the sear 24, the actuators will be released to rotate on the shaft 2 under the action of the spring 31. During such rotation the arm 22 engages the bell crank 63 which is rotated on its pivot 33 to operate the pull connection 64.

The timing mechanism comprises a cylinder 34 adjustably suspended on a screw 35 provided with an adjusting nut 36 for raising or lowering the cylinder. A guide pin 37 on the cylinder head is guided between lugs 38 so as to prevent rotation of the cylinder. Movable within the cylinder is a piston or plunger 39 having a downwardly extending piston rod 40 guided at its lower end in a hole in the lug 29 and having fixed thereto intermediate its ends an indexing hub 41 adapted to determine the angular position of the plunger 39 during each operation.

The upper end of the cylinder 34 is closed air-tight. At a determined distance below the end of the cylinder the same is perforated with a hole 42. The plunger is accurately fitted to the cylinder with such a clearance as to permit it when released to descend against the suction within the cylinder at a predetermined rate. In the present instance a fit such that the plunger will drop four inches in the cylinder in three and one-half seconds has been used with success. The surface of the plunger 39 is recessed with a series of longitudinal grooves 43. These grooves are spaced at regular angular intervals around the plunger but have various lengths. The slots of different lengths are arranged in irregular order around the plunger. The longest of these slots is long enough to reach to the hole 42 in the cylinder when the plunger is in its uppermost position. It will be seen that by rotating the plunger 39 so that different grooves 43 are placed in alinement with the hole 42, different intervals of time will be required for the plunger to descend from its uppermost position to the lower end of the cylinder. This is for the reason that the vacuum created within the cylinder by the descent of the plunger retards such descent until the lower end of the groove 43 which happens to be in alinement with the hole 42 reaches that hole. When this occurs, air is admitted freely to the interior of the cylinder through the hole 42 and one of the grooves 43. From this time on there will be no vacuum retardation but the plunger will fall free. The duration of the vacuum retardation depends upon the initial distance from the hole 42 to the lower end of the groove 43 which is in alinement therewith.

The indexing hub 41 functions to aline one or another of the grooves 43 with the hole 42. This hub is provided with a series of outwardly extending projections 44 of angular spacing equal to that of the grooves 43. Between these projections are downwardly flaring openings 45 adapted to receive a guide pin 46 when the plunger descends. This guide pin is mounted in upstanding position on the lug 29 and cooperates with the openings 45 to position the plunger as it descends so as to aline one or another of the slots 43 with the hole 42. The hub 41 is further provided with a series of upstanding lugs or studs 47 adapted to engage a pawl 48 pivoted at 49 on the casing. The pawl 48 is provided with a stop pin 50 adapted to engage the pivot lug when the pawl drops so as to limit its downward movement when the hub 41 moves downwardly, the pawl dropping by gravity upon descent of the plunger. When the plunger is again raised the pawl engages one of the lugs 47 and as the hub rises the action of this pawl is to rotate the hub 41 and the plunger through a sufficient angular distance to bring another of the grooves 43 into alinement with the hole 42.

The operation of this mechanism is as follows: When the operator receives a signal to pull the trap, he pulls one or both of the handles 3 and 4 rearwardly against the stop 8. This first operates to stretch the spring 31 independently activating the actuator 16 for rotation on its pivot 2. If only one handle is pulled, the lug 19 or 21 of the other handle engages the lug 18 or 20 of its actuator and retains the same in inactive position.

Movement of the actuator 16 under the tension of the spring 31 is arrested by the sear 24. The operator retains the handle against the stop 8 until the trap has been released. The elevating lever 10 in its normal position, before the operating handle is pulled, is engaged under the indexing hub 41 and in this position retains the plunger in its uppermost position. When the operating handle is retracted the cam 9 depresses the lever 10, as already described, to the position shown in dotted lines in Figure 1. This releases the plunger 39 so that it may descend in the cylinder 34. Its descent is retarded, as already described, for an interval of time depending upon the length of the groove 43 which is at the moment in alinement with the hole 42. When this groove arrives at the hole 42 air is admitted to the cylinder and the plunger immediately drops so that the hub 41 strikes the firing pin 28 which in turn depresses the sear 24 and releases the actuator 16. Upon release of the actuator the latter rotates on its pivot 2 under the tension of its spring 31 and engages the bell crank 63, rotates the same on its pivot and operates the connection 64 to release the trap. When the handle is again returned to forward position the lever 10 is released and the latter is elevated by the spring 13. The forward end of this lever is forked to span the lower end of the piston rod 40, and lug 29, and engages under the hub 41 carrying the same upwardly to return the plunger to its uppermost position. Upon such return movement, the pawl 48 which has dropped down during the descent of the plunger until stopped by the pin 50, now engages one of the studs 47 next to the one engaged on the previous operation, and as the hub is raised it is rotated by the action of the pawl to bring a new groove 43 into alinement with the hole 42. The guide pin 46 is so positioned as to engage in one of the openings 45 as the plunger descends and operates to prevent rotation of the latter so as to maintain the grooves 43 in proper alinement. The height of this pin is limited so as to release the hub on its upward movement in time to be rotated by the pawl 48.

It will be seen, therefore, that when the operating handle is pulled the actuator 16 is activated for operation, but its action is opposed by the sear 24 and delayed until the timing plunger descends to operate the firing pin 28. The duration of the delay varies in accordance with the length of the slot 43. Upon each successive operation the indexing hub 41 is operated to rotate the plunger so as to bring another slot 43 into controlling position. The length of these slots are in irregular order around the plunger and accordingly the interval between the pulling of the handle and the release of the trap will vary in an irregular manner for successive operations. It will thus be practically impossible for a shooter to know beforehand how long an interval will elapse before his target appears. Such interval may be further varied, for instance, by arranging the pawl 48 to move the hub 41 two or more spaces instead of one, the number of grooves 43 being odd.

It is sometimes desirable to release all successive targets instantaneously. For this purpose the instantaneous release finger 26 is provided and mounted on shaft 25 for rotation therewith. This finger is normally held in an inoperative vertical position against the side of the case as indicated in Figure 1. It is secured in this position by a detent not shown.

For instantaneous release operation the finger 26 is turned clockwise in Figure 1 by means of a slot in the end of the shaft 25, which shaft projects slightly through the side of the case. The turning movement is continued until the head of 26 rests upon the abutment 27 of the sear 24. In this position either lever 3 or 4 being pulled against the stop 8 causes lever 10 to descend and its forked end to strike finger 26 which in turn transmits the blow to abutment 27 thus moving the sear 24 and releasing the actuator 16 even though the index hub 41 has not yet touched the firing pin 28.

In order to insure uniform operation of the traps in all weather conditions, Figure 5 shows means for compensating for the expansion and contraction of the connection 64 with changes of temperature. Where the member 64 connects with the trap it is attached to an extension shank 51 formed on the end of a spring 52. The other end of this spring is secured at 53 to the frame of the trap. The operating or releasing lever 54 of the trap has pivoted thereto at 55 a link 56 which has a laterally turned-over portion 57 at its lower end having a perforation through which the shank 51 passes. The link 56 is arranged to extend in substantially parallel relation with the spring 52. The lower end of the spring however forms a shoulder 58 normally separated from the turned over portion 57 of the link. This separation allows for contraction and expansion of the member 64, the shoulder 58 being moved toward or away from the part 57 as the length of the member 64 changes. When the member 64 is operated to release the trap the space between the part 57 of the link and the shoulder 58 of the spring is first taken up after which said shoulder engages said portion 57 and thereafter the link 56 is pulled to operate the member 54 and release the trap.

It will be seen that this invention provides a simple and reliable means for providing irregular timing of the operation of one or more traps. It will be noted that the timing is wholly beyond the control of the operator as he can not even see the parts involved, they being concealed by plates 65. His operation of the operating lever results simply in activating the actuator and releasing the timing mechanism. Thereafter the operations are beyond his control and the release depends entirely upon the operation of the timing plunger. The timing is automatically changed between successive operations, the different time intervals following each other in irregular order. The adjustment of the height of the cylinder by nut 36 governs the maximum distance from the top of the plunger 39 in its uppermost position to the relief hole 42. This distance, together with the weight of the plunger and its clearance in the cylinder, determines the maximum time interval possible.

It will be understood of course that various modifications may be made in the general principle without affecting the operation of the timing mechanism, as for instance the operating connections 64 may be replaced by electric circuits with a suitable type of switch performing the functions of the bell cranks 63. Furthermore, electrical means may be provided for performing the functions of the operating handles 3 and 4.

It will be noted further that the parts of the timing mechanism are all of simple and rugged construction so that their uniform operation is assured and accurate timing may be maintained.

While this invention has been described as embodied in a unitary device, it will be understood that individual features or sub-combinations thereof may be used without reference to other features and that the employment of such individual features or sub-combinations is contemplated by this invention and is within the scope of the appended claims.

It is obvious that various changes may be made, within the scope of the appended claims, in the details of construction without departing from the spirit of this invention; it is to be understood, therefore, that this invention is not limited to the specific details shown and/or described.

Having thus described the invention, what is claimed is:

1. Control apparatus for target traps, comprising, a movable actuator, a movable member operable by said actuator and mechanically connected to release a trap, means for activating said actuator for operating said member, means operating to arrest said activated actuator temporarily and at a definite time interval thereafter to release the same, and means operating automatically to vary such time interval for successive operations.

2. Control apparatus for target traps, comprising, a movable actuator, a movable member operable by said actuator and mechanically connected to release a trap, means for activating said actuator for operating said member, and means operating to arrest said activated actuator and thereafter to release the same.

3. Control apparatus for target traps, comprising, a movable actuator, a movable member operable by said actuator and mechanically connected to release a trap, means for activating said actuator for operating said member, and means operating to arrest said activated actuator temporarily and at a definite time interval thereafter to release the same.

4. Control apparatus for target traps, comprising, a movable actuator, a movable member operable by said actuator and mechanically connected to release a trap, means for activating said actuator for operating said member, a stop normally interposed in the path of said actuator, and delay means for tripping said stop.

5. Control apparatus for target traps, comprising, a movable actuator, a movable member operable by said actuator and mechanically connected to release a trap, means for activating said actuator for operating said member, a stop normally interposed in the path of said actuator, and delay means shiftable to a plurality of different time settings for tripping said stop.

6. Control apparatus for target traps, comprising, a movable actuator, movable connections engageable by said actuator for releasing a trap, means for activating said actuator for operating said connections, means normally operating to prevent operation of said activated actuator, and fluid-retarded delay means operating after a time interval to render said preventing means ineffective.

7. Control apparatus for target traps, comprising, a movable actuator, a movable member operable by said actuator and mechanically connected to release a trap, means for activating said actuator for operating said member, and means for delaying the action of said actuator including a fluid-retarded element shiftable to different positions to vary the retardation thereof.

8. Control apparatus for target traps, comprising, a movable actuator, a movable member operable by said actuator and mechanically connected to release a trap, means for activating said actuator for operating said member, releasable means normally preventing operation of said activated actuator, a fluid-retarded element movable to release said preventing means, and means providing a series of fluid by-passes adapted to vary the retardation of said element.

9. Control apparatus for target traps, comprising, a movable actuator, a movable member operable by said actuator and mechanically connected to release a trap, means for activating said actuator for operating said member, releasable means normally preventing operation of said activated actuator, a fluid-retarded element movable to release said preventing means, and means providing a series of fluid by-passes adapted to vary the retardation of said element, and means operating upon each operation of the apparatus to change by-passes so as to vary the timing of said element for successive operations.

10. In combination with a plurality of target traps, control apparatus comprising, a movable actuator for each trap, movable connections engageable by each actuator for releasing its trap, means for activating one or more of said actuators simultaneously, means normally preventing the operation of said activated actuators, and means adjustable to operate after a definite time interval adapted to render said preventing means ineffective with respect to one or more of said actuators.

11. In combination with a plurality of target traps, control apparatus comprising, a movable actuator for each trap, movable connections engageable by each actuator for releasing its trap, means for activating one or more of said actuators simultaneously, said means including a pair of symmetrically matched manipulating elements each having an individual handle and the pair having matched handles forming a common grip, means normally preventing the operation of said actuators, and means adjustable to operate after a definite time interval adapted to render said preventing means ineffective.

12. Control apparatus for target traps, comprising, a movable actuator, movable means operable by said actuator and mechanically connected to release a trap, means for activating said actuator for operating said releasing means, and self-releasing arresting means engageable with said activated actuator to delay the action thereof.

13. Control apparatus for target traps, comprising, a movable actuator, movable means operable by said actuator and mechanically connected to release a trap, means for activating said actuator for operating said releasing means, self-releasing arresting means engageable with said activated actuator to delay the action thereof, and means operating to change the period of delay for successive operations.

14. Control apparatus for target traps, comprising, a movable actuator, movable means operable by said actuator and mechanically connected to release a trap, means for activating said actuator for operating said releasing means, self-releasing arresting means engageable with said activated actuator to delay the action thereof, and means for delaying the release of said arresting means operating to impose a series of delays of irregular duration for successive operations.

15. A device for automatically initiating the operation of mechanism, comprising, operated means, a movable actuator, movable means operable by said actuator and connected to initiate operation of the mechanism, means for activating said actuator, and self-releasing arresting means engageable with said activated actuator to delay the action thereof.

16. A device for automatically initiating the operation of mechanism, comprising, operated means, a movable actuator, movable means operable by said actuator and connected to initiate operation of the mechanism, means for activating said actuator, self-releasing arresting means engageable with said activated actuator to delay the action thereof, and means operating to change the period of delay for successive operations.

HARRY CLARK FOSTER.
LOUIS LEROY.